United States Patent
Terry et al.

(10) Patent No.: US 11,120,006 B2
(45) Date of Patent: Sep. 14, 2021

(54) ORDERING TRANSACTION REQUESTS IN A DISTRIBUTED DATABASE ACCORDING TO AN INDEPENDENTLY ASSIGNED SEQUENCE

(71) Applicant: Amazon Technologies, Inc., Seattle, WA (US)

(72) Inventors: Douglas Brian Terry, San Carlos, CA (US); Tate Andrew Certain, Seattle, WA (US); Amit Gupta, Redmond, WA (US); Rishabh Jain, Seattle, WA (US); Vaibhav Jain, Seattle, WA (US); Alexander Richard Keyes, Seattle, WA (US); Somasundaram Perianayagam, Seattle, WA (US); Nathan Pellegrom Riley, Seattle, WA (US); Akshat Vig, Seattle, WA (US); Ming-Chuan Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 310 days.

(21) Appl. No.: 16/014,890

(22) Filed: Jun. 21, 2018

(65) Prior Publication Data

US 2019/0392061 A1 Dec. 26, 2019

(51) Int. Cl.
*G06F 7/00* (2006.01)
*G06F 17/00* (2019.01)
(Continued)

(52) U.S. Cl.
CPC ........ *G06F 16/2365* (2019.01); *G06F 9/4881* (2013.01); *G06F 9/5038* (2013.01);
(Continued)

(58) Field of Classification Search
CPC ............ G06F 17/30371; G06F 9/5038; G06F 9/4881; G06F 17/30185; G06F 17/30194; G06F 17/30377
(Continued)

(56) References Cited

U.S. PATENT DOCUMENTS 5,838,923 A * 11/1998 Lee ...................... G06Q 10/107
709/236
6,298,345 B1 * 10/2001 Armstrong, Jr. ..... G06F 11/1471
(Continued)

FOREIGN PATENT DOCUMENTS

EP 3185143 6/2017

OTHER PUBLICATIONS

International Search Report and Written Opinion from PCT/US2019/038120, dated Sep. 30, 2019, pp. 1-15.
(Continued)

*Primary Examiner* — Binh V Ho
(74) *Attorney, Agent, or Firm* — Robert C. Kowert; Kowert, Hood, Munyon, Rankin & Goetzel, P.C.

(57) ABSTRACT

Transaction requests may be ordered in a distributed database according to an independently assigned sequence. Different distributed system nodes, such as a transaction coordinator and a storage node may independently assign sequence numbers to requests to access a distributed database. A storage node may receive the request from a transaction coordinator with an assigned sequence number and another request to which the storage node may assign a sequence number. The storage node can then order performance of the requests based on the sequence numbers.

20 Claims, 13 Drawing Sheets

(51) Int. Cl.
    *G06F 16/23*     (2019.01)
    *G06F 16/182*     (2019.01)
    *G06F 16/18*     (2019.01)
    *G06F 9/48*     (2006.01)
    *G06F 9/50*     (2006.01)

(52) U.S. Cl.
    CPC ........ G06F 16/182 (2019.01); G06F 16/1805 (2019.01); G06F 16/2379 (2019.01)

(58) Field of Classification Search
    USPC ........................................................ 707/687
    See application file for complete search history.

(56) References Cited

U.S. PATENT DOCUMENTS

| | | | | |
|---|---|---|---|---|
| 2007/0143299 | A1* | 6/2007 | Huras | G06F 9/466 |
| 2007/0203910 | A1* | 8/2007 | Ferguson | G06F 16/27 |
| 2009/0063781 | A1* | 3/2009 | Ebersole | G06F 16/24552 |
| | | | | 711/141 |
| 2014/0149346 | A1* | 5/2014 | Yanovsky | G06F 16/27 |
| | | | | 707/615 |
| 2015/0019792 | A1* | 1/2015 | Swanson | G06F 12/0223 |
| | | | | 711/102 |
| 2015/0261563 | A1* | 9/2015 | Guerin | G06F 9/466 |
| | | | | 707/703 |
| 2017/0177698 | A1* | 6/2017 | Lee | G06F 16/2455 |
| 2017/0214762 | A1* | 7/2017 | Swain | H04L 51/26 |
| 2018/0349430 | A1* | 12/2018 | Lee | G06F 16/28 |

OTHER PUBLICATIONS

U.S. Appl. No. 16/364,025, filed Mar. 25, 2019, Akshat Vig et al.
U.S. Appl. No. 16/364,036, filed Mar. 25, 2019, Rishabh Jain et al.

* cited by examiner ately assigned
ORDERING TRANSACTION REQUESTS IN A DISTRIBUTED DATABASE ACCORDING TO AN INDEPENDENTLY ASSIGNED SEQUENCE

BACKGROUND

Different database systems offer different features for performing operations with respect to data in the database system. In some scenarios, some features may provide some functionality at the cost of other capabilities or performance. For example, transactions offered as a feature of a database may provide facilitate the construction of correct and reliable applications that wish to maintain multi-item invariants. Thus, highly performant techniques for implementing transaction feature may be desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1:
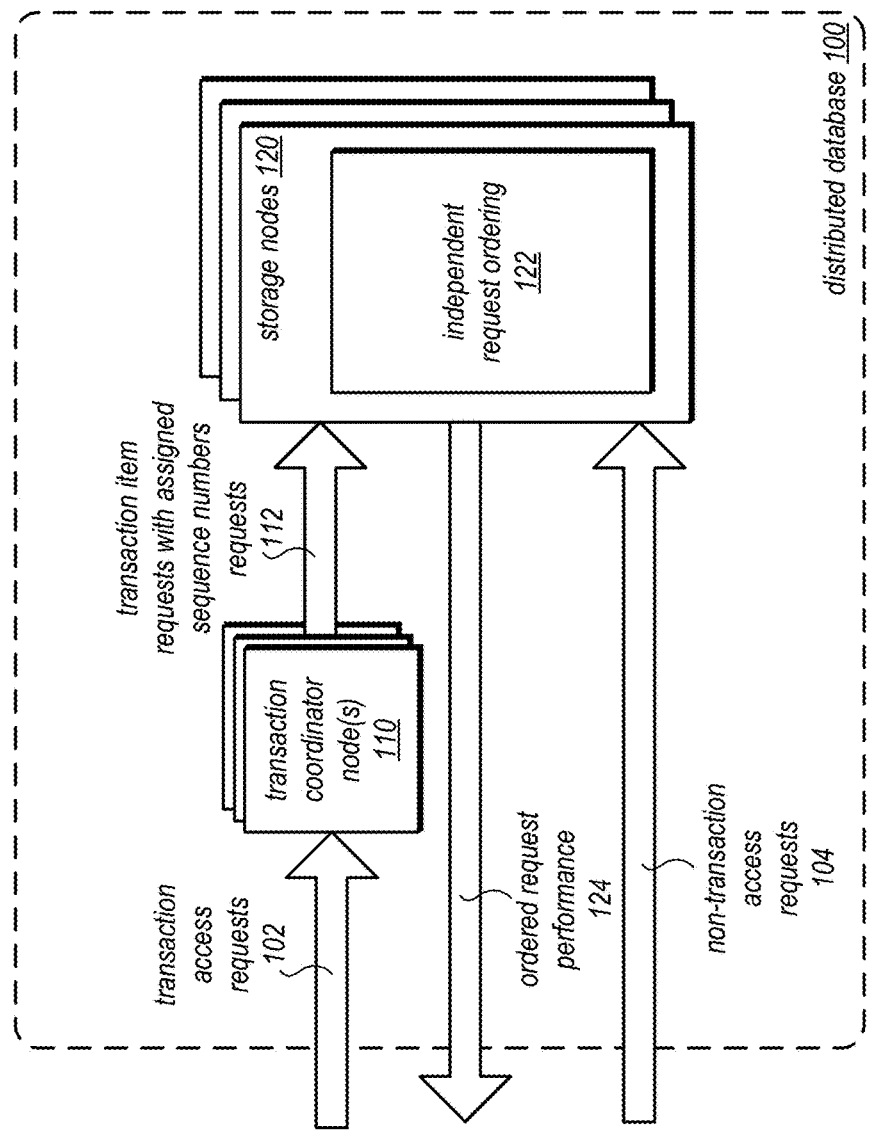
FIG. 1 is a logical block diagram illustrating ordering transaction requests in a distributed database according to an independently assigned sequence, according to some embodiments.

The systems and methods described herein may be employed in various combinations and in various embodiments to implement ordering transaction requests in a distributed database according to an independently assigned sequence, according to some embodiments. Distributed database systems can offer many performance advantages to users, in various embodiments. By distributing the data and work to access the data amongst multiple storage locations, a distributed database system can offer scalable, available, and highly performant storage, in some embodiments. To support transactions in addition to requests for individual items, distributed database systems may order the performance of requests, including transaction operations in order to ensure that Atomicity Consistency Isolation and Durability (ACID) principles are satisfied in order to ensure that transactions are perceived as a single logical operation in the distributed database, in various embodiments. Ordering transaction requests according to an independently assigned sequence, as discussed below, may reduce work and inter-system traffic between nodes of a distributed database system in order to perform ACID compliant transactions, and thus may improve the performance of a distributed database system, in various embodiments. FIG. 1 is a logical block diagram illustrating ordering transaction requests in a distributed database according to an independently assigned sequence, according to some embodiments.

Distributed database 100 may store data for a database (e.g., a partition of a database table) across one or multiple locations, such as at different storage nodes 120, in some embodiments. Distributed database 100 may be any of various types of database systems, including relational and non-relational database systems that may allow transaction requests, in some embodiments. In order to ensure that a transaction request performed across multiple locations in distributed database 100 is fully compliant with ACID principles, a transaction coordinator may be implemented, such as transaction coordinator 110. Transaction access requests 102 may be submitted, routed, or dispatched to transaction coordinator node(s) 110 which may interact with storage nodes 120 to perform the requested transactions. Non-transaction access requests 104, however, may be submitted, routed, or dispatched directly to storage nodes 120, in some embodiments.

In order to ensure that the performance of transactions that may occur across multiple storage nodes 120 does not impede the performance of non-transaction access requests 104 (which may only access data at a single location), storage nodes 120 may implement independent request ordering 122 in order to determine an ordering for performing received access requests, as indicated by ordered request performance 124, in some embodiments. Each storage node 120 may determine whether to accept a proposed request (e.g., whether the request can be performed without violating ACID properties for transactions or the performance of non-transaction access requests), and in what order the request should be performed relative to other received requests without consulting or relying upon other storage nodes 120 and/or transaction coordinator 110, in some embodiments. For example, a non-transaction access request 104 can be accepted or rejected (if conflicting) at storage node 120 which may also be performing a transaction received from one of transaction coordinator nodes 110 without requesting information from transaction coordinator node 110 to determine if and when the non-transaction access request 104 should be performed, as discussed below with regard to FIGS. 3B, 7, and 10-12, in some embodiments. Similarly, transactions submitted to transaction coordinator nodes 112 may be performed by the transaction coordinator nodes 112 across multiple locations without having to coordinate with the non-transaction requests received at the storage nodes 120 involved in a given transaction, as discussed below with regard to FIGS. 3A, 4, 7, 8, and 9, in some embodiments. For example, as discussed below with regard to FIG. 7, sequence numbers for ordering requests may be independently assigned, for transactions at transaction coordination nodes and for non-transactions at storage nodes 120, and then ordered based on the sequence values, in some embodiments. In this way, synchronization to implement a global sequence across all transaction coordinator nodes and/or storage nodes 120 does not have to be implemented, in some embodiments, reducing work and traffic between nodes of a distributed database. Instead, each storage node 120 can reason independently about the order in which the requests received at the storage node 120 should be performed (or if they should be performed) without violating ACID principles for transactions, in some embodiments.

Please note that previous descriptions of implementing ordering transaction requests in a distributed database according to an independently assigned sequence are not intended to be limiting, but are merely provided as logical examples.

This specification begins with a general description of a provider network that may implement a database service that may implement ordering transaction requests in a distributed database according to an independently assigned sequence. Then various examples of a database service are discussed, including different components/modules, or arrangements of components/module, that may be employed as part of implementing the database service, in one embodiment. A number of different methods and techniques to implement ordering transaction requests in a distributed database according to an independently assigned sequence are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
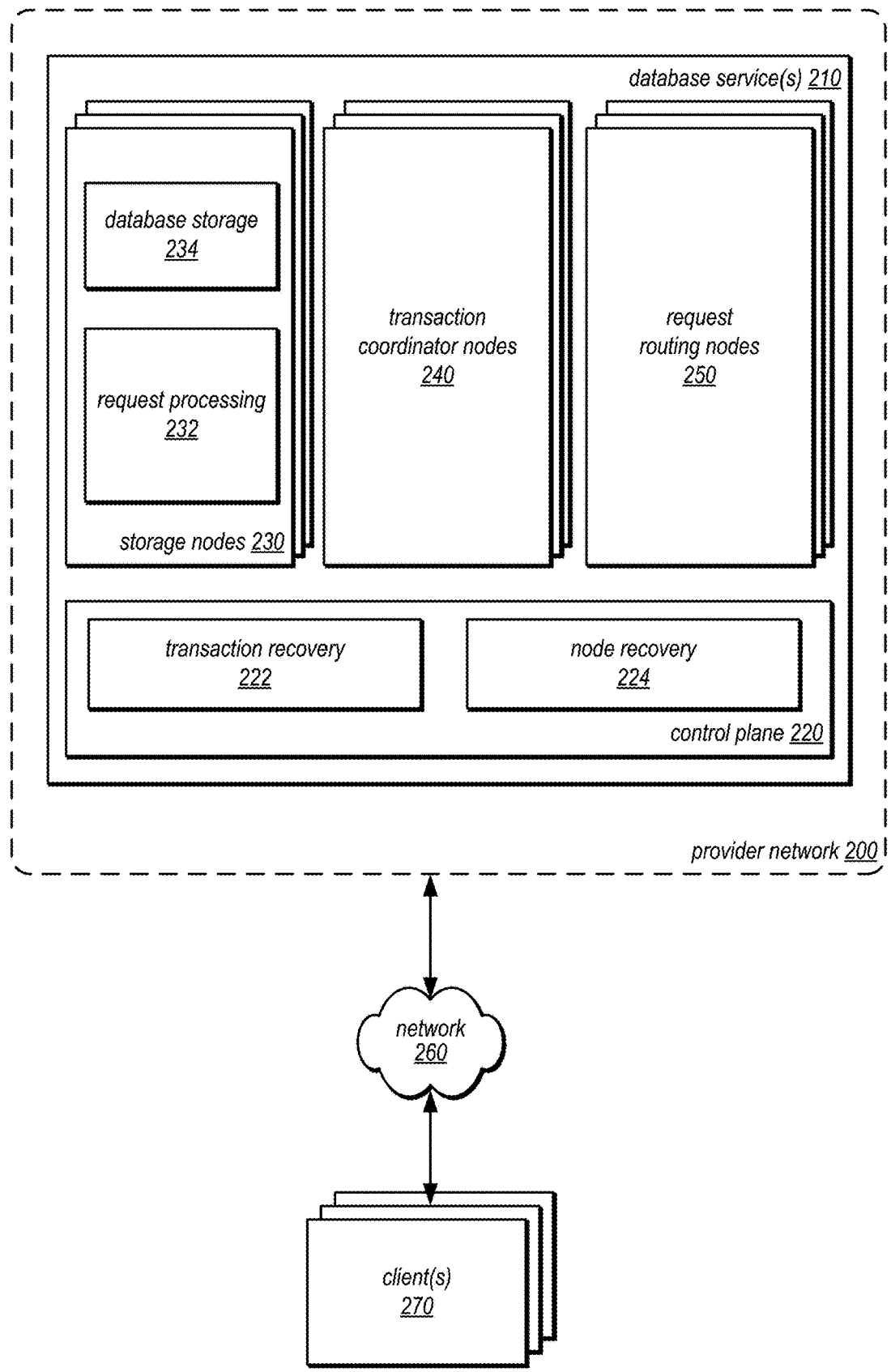
FIG. 2 is a logical block diagram illustrating a provider network that implements a database service that may implement ordering transaction requests according to an independently assigned sequence, according to some embodiments.

FIG. 2 is a logical block diagram illustrating a provider network that implements a database service that may implement ordering transaction requests according to an independently assigned sequence, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 13), needed to implement and distribute the infrastructure and storage services offered by the provider network 200. In one embodiment, provider network 200 may implement various computing resources or services, such as database service(s) 210 (e.g., relational or non-relational (NoSQL) database query engines), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 13 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service (s) 210 may provide a RESTful programmatic interface in order to submit access requests (e.g., to get, insert, delete, or query data). In one embodiment, database service(s) 210 may also be any of various types of data processing services that implement or allow transactions.

In one embodiment, clients 250 may encompass any type of client configurable to submit network-based requests to provider network 200 via network 260, including requests for database service(s) 210 (e.g., to perform a transaction to a database hosted in database service 210). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database client/application (or user interface thereof), a media application, an office application or any other application that may make use of a database in database service(s) 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service).

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Figure 3A:
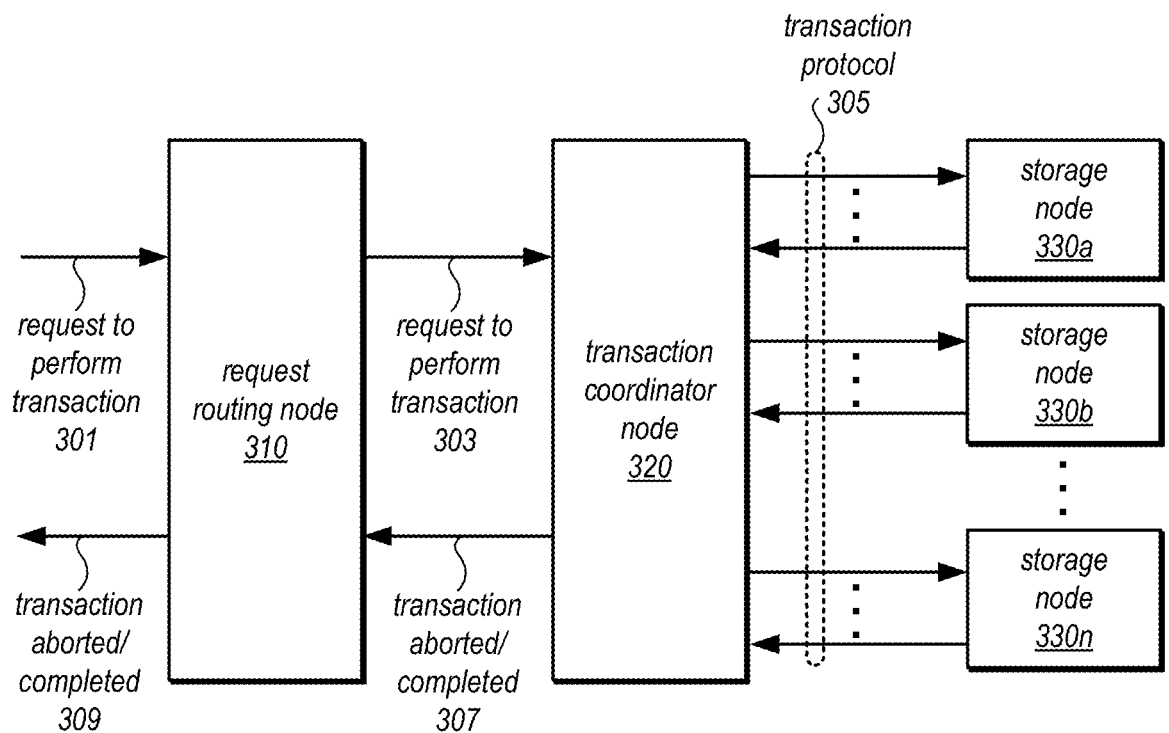
FIGS. 3A and 3B are logical block diagrams illustrating different routing paths for transactions and non-transaction requests, according to some embodiments.
Figure 3B:
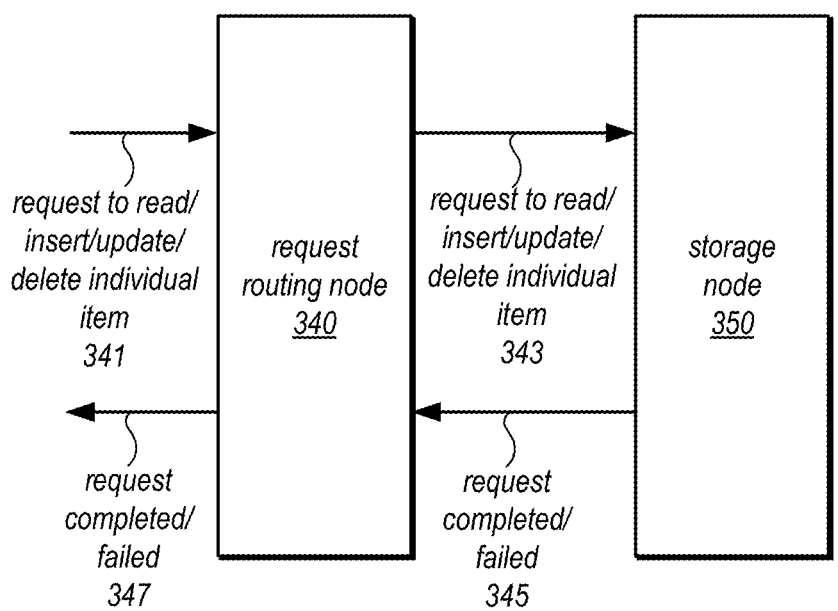

Database service 210 may implement request routing nodes 250, in one embodiment. Request routing nodes 250 may receive, authenticate, parse, throttle and/or dispatch service or other access requests, among other things, in one embodiment. For example, FIGS. 3A and 3B illustrate different routing paths for transactions and non-transaction requests, according to some embodiments. As discussed below with regard to FIGS. 3A and 4-12, a transaction coordinator node, such as one of transaction coordinator nodes 240, may be included in the path for a request to perform a transaction, in some embodiments, while a non-transaction request may be sent directly to an appropriate storage node.

In one embodiment, request routing nodes 250 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in database service(s) 210.

In one embodiment, database service 210 may implement control plane 220 to implement one or more administrative components, such as automated admin instances which may provide a variety of visibility and/or control functions). Control plane 220 may provide visibility and control to system administrators, detect split events for partitions of tables at storage nodes, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 320 may direct the performance of different types of control plane operations among the nodes, systems, or devices implementing database service 210, in one embodiment. For instance, control plane 220 may communicate with processing nodes to initiate the performance of various control plane operations, such as moves, splits, update tables, delete tables, create indexes, etc. . . . In one embodiment, control plane 220 may include a node recovery feature or component that handles failure events for storage nodes 230, transaction coordinator nodes 240, and request routing nodes 250 (e.g., adding new nodes, removing failing or underperforming nodes, deactivating or decommissioning underutilized nodes, etc). As discussed in more detail below with regard to FIGS. 6A and 6B, control plane 220 may implement transaction recovery 222 to detect or handle the failure of aborted, stalled, or other transactions, in some embodiments.

In one embodiment, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement request processing 232, in one embodiment. Request processing 232 may create, update, define, query, and/or otherwise administer databases, in one embodiment. For instance, request processing 232 may maintain a database according to a database model (e.g., a relational or non-relational database model). In one embodiment, request processing 232 may allow a client to manage data definitions (e.g., Data Definition Language (DDL) requests to describe column definitions, requests to add item attributes, etc.). In one embodiment, request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, request processing 232 may also perform other management functions, such as enforcing access controls or permissions, concurrency control, or recovery operations.

In one embodiment, database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the database service 210. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments. As discussed below with regard to FIG. 5, in some embodiments, items in a table may include attributes that are either system data or application data.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

FIG. 3A illustrates a routing path for requests to perform transactions. A request routing node 310 may receive a request 301 to perform a transaction (e.g., a TransactItems request). In some embodiments, the request 301 may include one or more operations to perform as part of the transaction (e.g., read/get, write/update, insert/add, delete/remove operations). In at least some embodiments, the request 301 may include preconditions to be met in order for the transaction to commit. For instance, a precondition may check that an attribute exists or that it has a specific value or that its value begins with a particular string. Preconditions may involve any items in any tables and are not limited to the items being updated in the transaction (e.g., a transaction is performed upon table A but a precondition can be specified and evaluated with respect to table B). As an example, suppose that an application wishes to transfer $50 from Bob's bank account to Mary's account. This application may first read both Bob's and Mary's account balances, compute the adjusted amounts, and then submit a transaction that writes new balances with the condition that the balances did not change between when they were read and when the transaction was processed.

Request routing node 310 may dispatch or send the request 303 to perform the transaction 303 to a selected transaction coordination node 320 (e.g., according to various load balancing or other request distribution techniques), in some embodiments. Transaction coordinator node 320 may perform a transaction protocol 305, discussed in detail below with regard to FIGS. 4 and 8, in some embodiments. Request may be sent to one or multiple storage nodes, such as storage nodes 330a, 330b, and 330n. Storage nodes 330 may order the transaction (or reject/abort/fail it) according to a timestamp value or other sequence value assigned to it by transaction coordinator node 320, as discussed above with regard to FIG. 1 and below with regard to FIGS. 4, 5, 7, and 9-12 along with other transactions received from transaction coordinator 320 and/or directly from request routing node 310 (or other request routing node). Transaction coordinator node 320 may return an indication as to whether the transaction aborted or completed successfully to request routing node 310, which in turn may return an indication as to whether the transaction aborted or completed 309 (e.g., to a requesting client).

FIG. 3B illustrates a routing path for requests to perform non-transactions, according to some embodiments. As indicated at 341, a request routing node 340 may receive a request to read, inset, update, or delete an individual item in a database table, in some embodiments. Instead of routing the request to a transaction coordinator, like transaction coordinator 320 in FIG. 3A, request routing node 340 may direct the request 343 directly to a storage node that stores the item (e.g., in the appropriate partition of a database table), in some embodiments. For example, request routing node 340 may maintain a listing or other information describing a partitioning scheme for a table (e.g., a primary key value and hash function to determine a hash value that may be mapped to one partition of the table. Storage node 350 may determine whether to complete or fail the request to read, insert, update, or delete the individual item, according to the techniques discussed below with regard to FIGS. 9-12, independently from other storage nodes or a transaction coordinator perform a transaction that includes an operation to be performed at storage node 350. As indicated at 345 and 347, an indication that the request completed or failed may be provided to request routing node 340, which may in turn provide the request completion/failure notification to a client.

Figure 4:
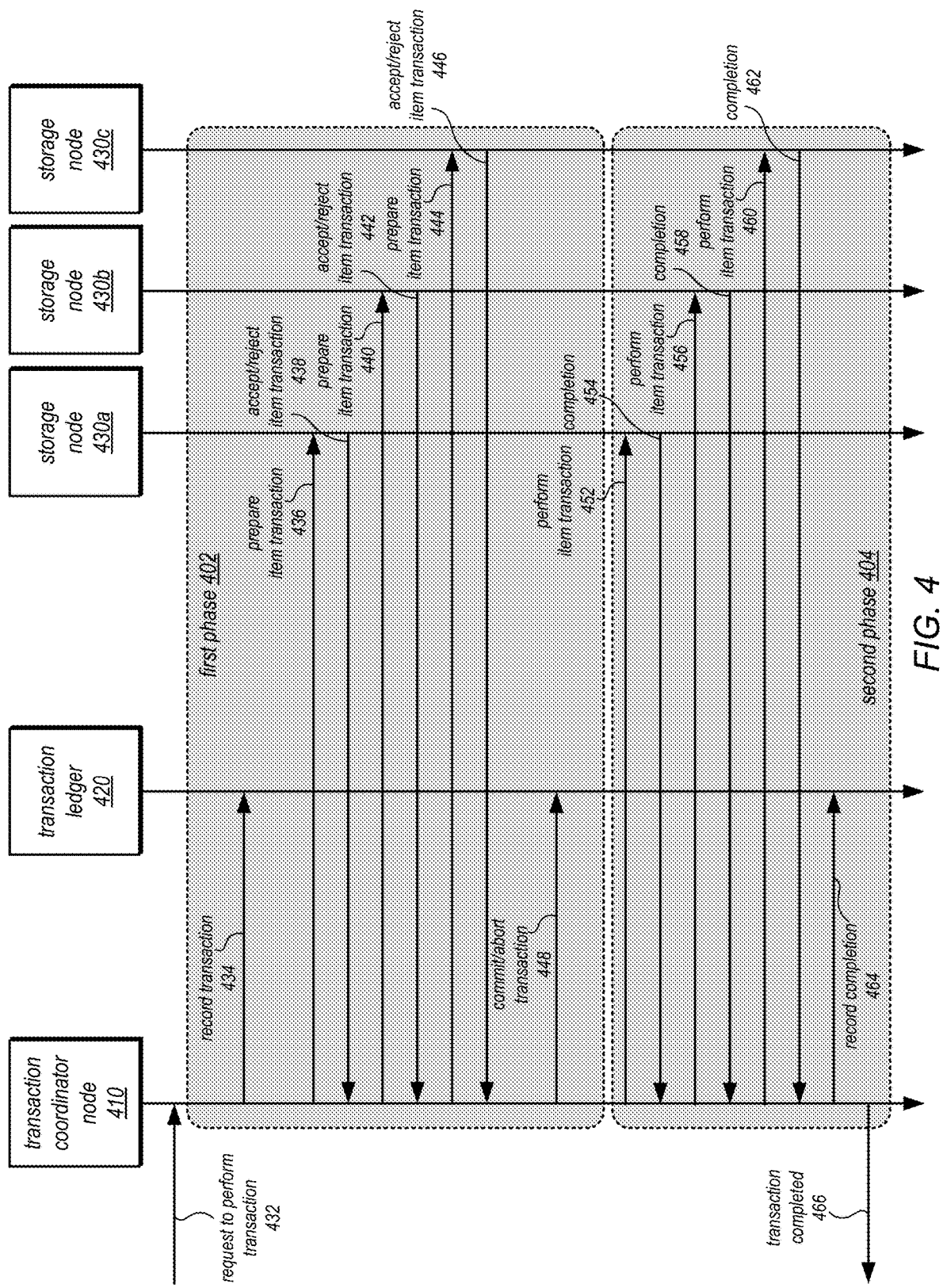
FIG. 4 is a sequence diagram illustrating a transaction protocol, according to some embodiments.
Figure 5A:
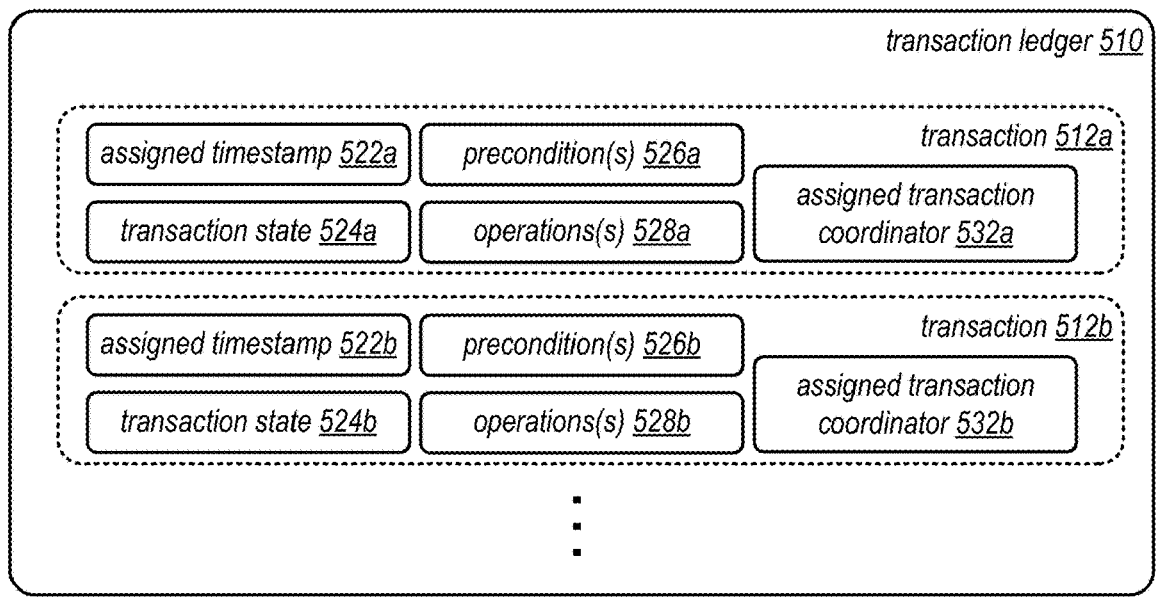
FIG. 5A is an example transaction ledger for performing a transaction protocol, according to some embodiments.

FIG. 4 is a sequence diagram illustrating a transaction protocol, according to some embodiments. In at least some embodiments, a two-phase protocol may be implemented for a transaction coordinator to determine whether a transaction can be committed to a distributed database. A request to perform a transaction may be received 432 at transaction coordinator node 410, in some embodiments. Transaction coordinator 410 may record the transaction 434 in transaction ledger 420, in some embodiments. FIG. 5A is an example transaction ledger for performing a transaction protocol, according to some embodiments.

In various embodiments, transaction ledger 420 may be maintained to ensure the survival of transactions beyond the failure of individual transaction coordinators. For example, to ensure that a failure of a transaction coordinator, such as transaction coordinator 410, does not result in a partially executed transaction, which would violate an atomicity guarantee for the transaction that all (or none) of a transaction completes, the transaction coordinator may store various information about the transaction so that the transaction can be resumed by another transaction coordinator in some embodiments. In FIG. 5A, transaction ledger 510 (which may be similar to transaction ledger 420 in FIG. 4) may store transactions across database service 210 (or a portion thereof), in some embodiments.

A transaction entry, such as entries 512a and 512b, may include, a timestamp assigned to the transaction by the transaction coordinator 522a and 522b, preconditions (if any) of operations performed in the transaction 526a and 526b, the operations to be performed (e.g., reads, writes, updates, inserts, additions, deletions, etc.) 528a and 528b and an identifier of the assigned transaction coordinator 532a and 532b, in some embodiments. The state of the transaction, transaction state 524a and 524b, may be included and updated, in some embodiments. For example, the possible states of transaction state 524 may include "Started," "Committed," "Completed," or "Aborted."

A transaction ledger may be implemented using various storage technologies or systems, in some embodiments. For example, transaction ledger 420 may be implemented as another table in database service 210 or hosted in another type of storage system or service in provider network 200. In at least some embodiments, transaction ledge may be organized as an append-only log. In some embodiments, transaction ledger 420 may support operations for scanning and truncating the log. For example, scanning may be used for transaction recovery, as discussed below with regard to FIGS. 6A and 6B. In some embodiments, portions of the ledger that contain already committed or aborted transactions can be discarded using truncation to reclaim space and to reduce the number of records (e.g., when scanned for transaction recovery). In some embodiments, transaction records may be retained for a period of time to support additional features such as monitoring and/or debugging. In some embodiments, transactions on different tables may share the same transaction ledger. In some embodiments, multiple transaction ledgers could be used in parallel. In some embodiments, transactions can be assigned to a ledger using a fixed assignment, e.g. all transactions on tables in a specific customer account use a specific ledger, or can be randomly assigned to a transaction ledger. In at least some embodiments, transaction ledgers may be used to provide a stream of transactions performed in database and/or table that are sent to another system.

Turning back to FIG. 4, transaction coordinator may send requests to prepare an individual item within the transaction, such as requests 436, 440, and 444, for the transaction to the storage nodes that store the transaction, such as storage nodes 430a, 430b, and 430c. Storage nodes 430 may also receive a timestamp value assigned to the transaction, as well as further information, for determining whether the storage node 430 can accept the transaction for the item, in some embodiments, based on an evaluation of the timestamp and other information maintained for the item by storage nodes 430a.

Figure 5B:
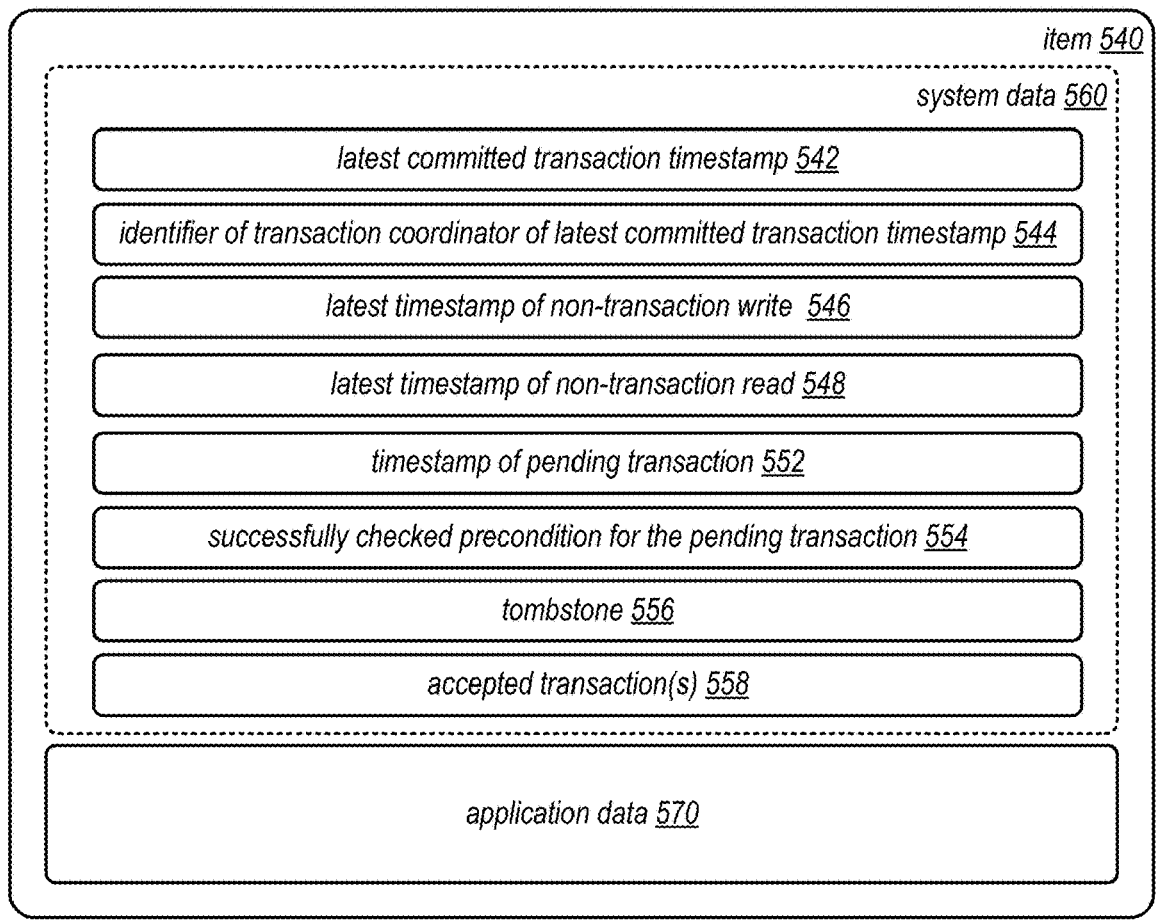
FIG. 5B is an example item that includes system data for ordering transaction requests according to an independently assigned sequence and application data, according to some embodiments.

FIG. 5B is an example item that includes system data for ordering transaction requests according to an independently assigned sequence and application data, according to some embodiments. Item 540 may maintain system data 560 (e.g., as attributes of the item 540 or in a separate collection of data describing one or multiple items) and application data 570 (e.g., application visible data used by an application when interacting with item 540), in some embodiments. System data 560 may include various information for ordering, accepting, and/or rejecting transaction requests and non-transaction requests at storage nodes. For example, system data 560 may include a timestamp of a latest committed transaction operation 542 that has written to the item, an identifier 544 of a transaction coordinator that submitted the transaction of the latest committed transaction operation 542 that has written to the item, a timestamp of the latest non-transaction write to the item 546, a timestamp of the latest read of the item 548, a timestamp of pending transaction 552 that intends to write to the item, an indication of a successfully checked precondition for the pending transaction 554, an indication of whether item has been deleted according to a tombstone marker 556, and a history or set of transactions 558 that have been accepted but not yet performed, in some embodiments.

Returning to FIG. 4, storage nodes 430 may send respective determinations 438, 442, and 446 to transaction coordinator node 410, indicating whether the transaction for the item is accepted or rejected by the storage node. If transaction coordinator node 410 does not receive a response, transaction coordinator node 410 may retry a number of times before aborting the transaction. Based on the responses, transaction coordinator 410 may determine whether the transaction can be committed or aborted, in some embodiments. An update to transaction ledger 420 to reflect the decision 448 may be made, in some embodiments. The first phase 402 may be complete. Please note that further interactions as discussed below with regard to FIG. 8 may be performed if the transaction aborts which are not illustrated.

If the transaction is committed, second phase 404 may be performed by transaction coordinator node 410. Transaction coordinator node 410 may send respective requests to perform the item transactions, 452, 456, and 460, to storage nodes 430. Once storage nodes 430 have performed the item transactions (which may be performed according to an ordering or timing determined by storage nodes 430 after receipt of requests 452, 456, and 460, in some embodiments, then storage nodes 430 may return responses indicating completion, such as responses 454, 458, and 462. Transaction coordinator 410 may record 464 the state of the transaction as completed in transaction ledger 420 and send a completion indication 466 for the transaction (e.g., to a client or request routing node to forward to a client).

Figure 6A:
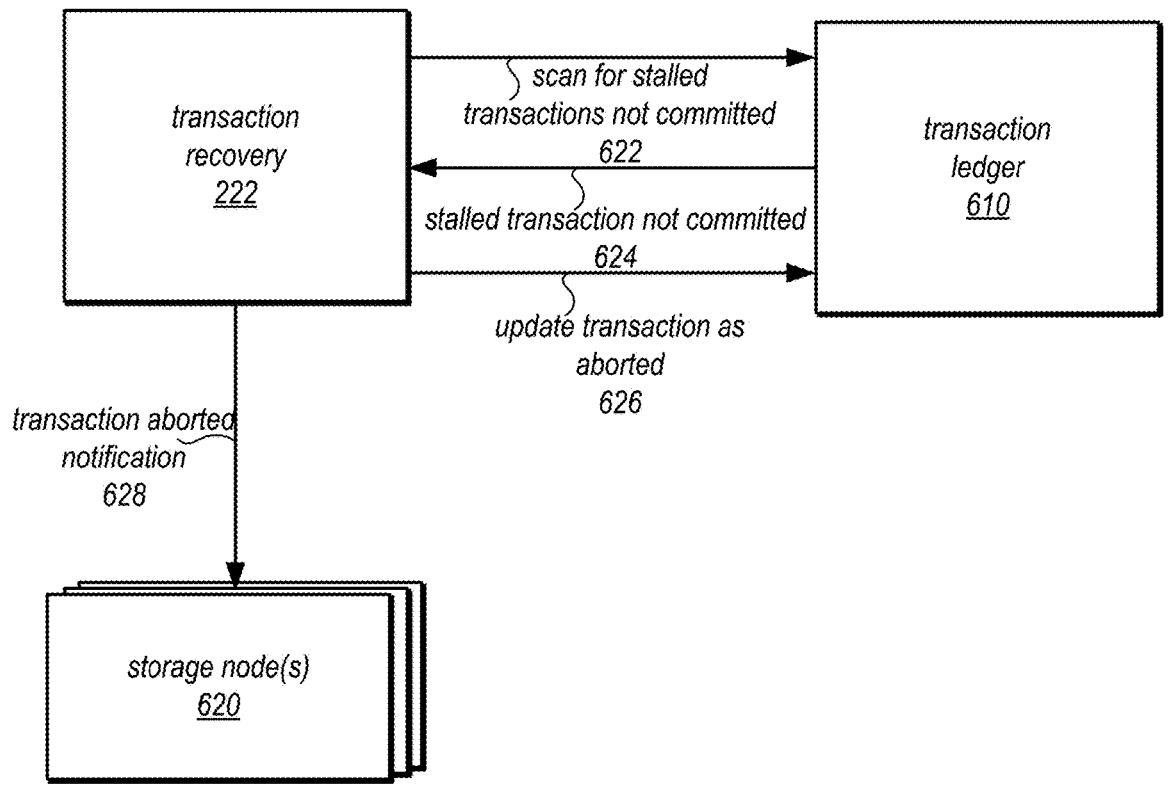
FIGS. 6A and 6B are logical block diagrams illustrating interactions between transaction recovery and storage nodes or transaction coordinator nodes, according to some embodiments.

Transaction recovery may be implemented in various embodiments. Transaction recovery, such as transaction recovery 222 illustrated in FIGS. 2, 6A, and 6B may scan a transaction ledger for transactions for which there are "started" records but no subsequent "completed" or "aborted" records, in some embodiments. For example, as illustrated in FIG. 6A transaction recovery 222 may perform one or more requests to scan for stalled transactions that are "started" but have not progressed to a "committed" state, as indicated at 622. Those stalled transactions not committed in transaction ledger 610 may be indicated to transaction recovery 222. Transaction recovery 222 may then abort these transactions. For example, transaction recovery 222 may update 626 the transaction in transaction ledger 610 to an "aborted" state. Transaction recovery 222 may, in some embodiments, send notifications 628 to the storage nodes 620 that may have pending requests for the transaction that the transaction has been aborted.

Figure 6B:
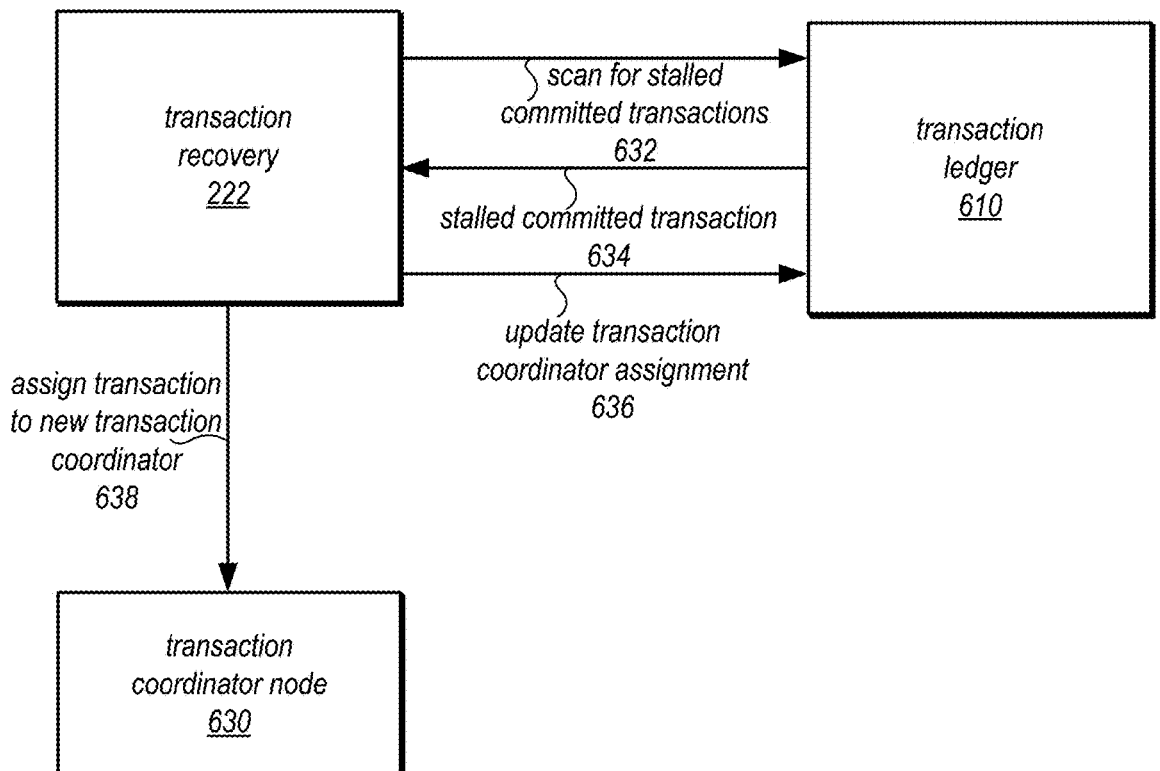

FIG. 6B may illustrate scenarios where transaction recovery can account for failures of transaction coordinator nodes. For example, as indicated at 632, transaction recovery may scan for stalled transactions that have a "committed" state. These stalled committed transactions 634 may be indicated to transaction recovery 222. Transaction recovery 222 can then assign a new transaction coordinator 638 to the transaction. For example, transaction coordinator may send a request (e.g., via a load balancer) to assign a transaction 638 (as if the request were dispatched by a request routing node). The transaction coordinator node 630 may then check the state in transaction ledger 610 and begin the second phase of the transaction, in some embodiments. Transaction recovery 222 may update the transaction coordinator assignment 636 in transaction ledger 610, in some embodiments. Multiple failures of a transaction coordinator can be handled in similar fashion to the techniques discussed above, in some embodiments.

If in a scenario where two transaction coordinators were executing the same transaction at the same time, storage nodes may implement idempotent performance of transaction operations to ensure that duplicated requests will be rejected as obsolete since the transaction timestamp is not greater than that of previously written items, as discussed below, in some embodiments. The same situation could occur if a coordinator fails and the new coordinator repeats some of the previously completed work. Therefore, transaction coordinators may interpret "obsoleted" responses from storage nodes the same as a "succeeded" response in order to progress through the transaction protocol, in some embodiments.

Figure 7:
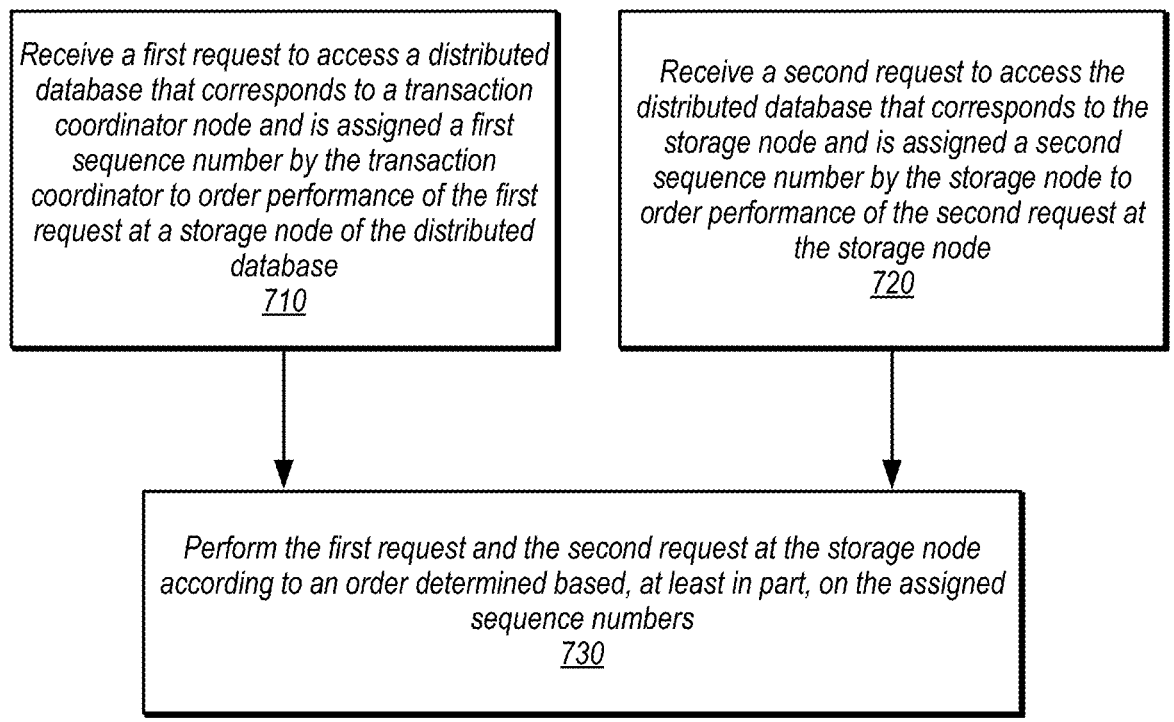
FIG. 7 is a high-level flowchart illustrating various methods and techniques to implement ordering transaction requests in a distributed database according to an independently assigned sequence, according to some embodiments.

The examples of a database service that implements as discussed in FIGS. 2-6B above have been given in regard to a database service (e.g., a non-relational or NoSQL database service or a relational database service). However, various other types of data access, management, or control systems or data processing systems may implement transactions across a distributed database and thus may implement ordering transaction requests in a distributed database according to an independently assigned sequence, in other embodiments. FIG. 7 is a high-level flowchart illustrating various methods and techniques to implement ordering transaction requests in a distributed database according to an independently assigned sequence, according to some embodiments. These techniques, as well as the techniques discussed with regard to FIGS. 8-12, may be implemented using components or systems as described above with regard to FIGS. 2-6B, as well as other types of databases, storage engines, or systems, and thus the following discussion is not intended to be limiting as to the other types of systems that may implement the described techniques.

As indicated at 710, a first request may be received to access a distributed database that corresponds to a transaction coordinator node and is assigned a first sequence number by the transaction coordinator node to order performance of the first request at a storage node of the distributed database, in various embodiments. For example, a request to perform a transaction, as discussed above with regard to FIGS. 1, 3A, and 8, and FIG. 8 below may be received at a database system and dispatched or routed to a transaction coordinator node. In some embodiments, the request may be explicitly pointed to the transaction coordinator node (e.g., in scenarios where the transaction coordinator node may be identified to a client application as a transaction engine for the database).

The request may be formatted according to a protocol, interface (e.g., API), or other structure that identifies the request as a transaction, in some embodiments. The request may include the types of operation(s) to perform, in some embodiments, as a batch request. In some embodiments, the request may be the first of many requests associated with the transaction (e.g., after a BEGIN TRANSACTION SQL statement) which may subsequently submit additional operations to be included in the transaction, in some embodiments. Other information, such as preconditions for performing operations may also be included, in some embodiments. The transaction coordinator node may assign the transaction a sequence number (e.g., based on a monotonically increasing sequence or a timestamp value based on clock accessible to the transaction coordinator node), in some embodiments. The transaction coordinator node may forward the request to the storage node (or a portion thereof) to the storage node, in some embodiments.

As indicated at 720, a second request may be received to access the distributed database that corresponds to the storage node and is assigned a second sequence number by the storage node to order performance of the second request at the storage node, in some embodiments. The second request may, for example not be a transaction request but may be a request to access an individual item (e.g., a request to read, add, insert, update, modify, write, or delete an item), in some embodiments. The storage node may assign the second sequence number to the second request independently from the assignment of the first sequence number by the transaction coordinator node, in some embodiments. For example, the storage node may use a different clock (e.g., its own clock) to assign a timestamp of receipt of the second request as the second sequence number for the request. In some embodiments, the storage node may assign a sequence number that is provided to the storage node in the request (e.g., from a request routing node or client) but one that is not received from a storage node.

As indicated at 730, the first and second requests may be performed at the storage node according to an order determined based, at least in part, on the assigned sequence numbers. For example, sequence number comparisons (e.g., like the timestamp comparisons discussed below) may be performed in order to order the requests. In some scenarios, the ordering may be further determined based on other factors, such as the arrival of the requests at the storage node and/or the type of request (e.g., a transaction or non-transaction, what type of non-transaction request, etc.). Because the storage node can perform the ordering (and/or rejecting of requests, in some instances), non-transaction requests may not have to be performed using a transaction protocol, improving the performance of the non-transaction requests (and reducing burdens on a transaction coordinator node), in some embodiments.

Figure 8:
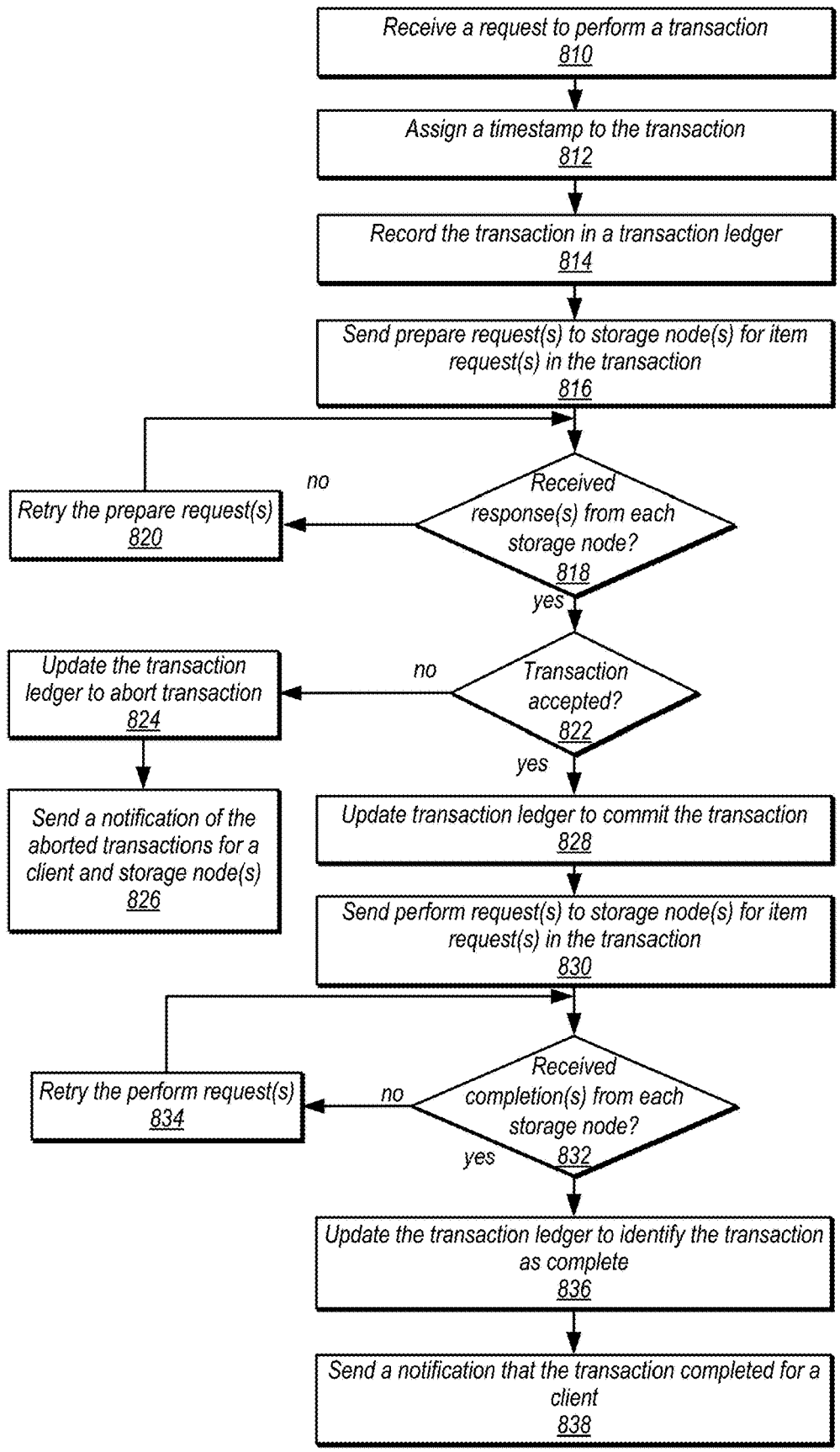
FIG. 8 is a high-level flowchart illustrating various methods and techniques to coordinate the performance of a transaction across storage nodes that order transaction requests, according to some embodiments.

A transaction coordinator node may implement various transaction protocols to determine whether a transaction can be performed or aborted at distributed database. FIG. 8 is a high-level flowchart illustrating various methods and techniques to coordinate the performance of a transaction across storage nodes that order transaction requests, according to some embodiments. As indicated at 810, a request to perform a transaction may be received, in some embodiments. The request may be received at a transaction coordinator node, for instance, which may assign a timestamp to the transaction, as indicated at 812. As indicated at 814, the transaction may be recorded in a transaction ledger, in some embodiments. For example, an entry for the transaction identifying the state of the transaction (e.g., "started") may be created, along with other information, such as a timestamp assigned to the transaction by the transaction coordinator, preconditions (if any) of operations performed in the transaction, the operations to be performed (e.g., reads, writes, updates, inserts, additions, deletions, etc.), and an identifier of the assigned transaction coordinator node, in some embodiments.

The transaction may be divided into slices or other portions so that the performance of an operation may be individually coordinated, in some embodiments. As indicated at 816, prepare request(s) may be sent to storage node(s) for item request(s) in the transaction, in some embodiments. For example, a key value for each item operated on in the transaction may be used to identify a partition of the database table at which the item is stored (and a corresponding storage node for the partition), in some embodiments. The request(s) may include the assigned timestamp for storage node decision-making, as discussed below.

As indicated at 818, if responses are not received from each storage node, then, the prepare requests (for the non-responsive storage nodes) may be retried, in some embodiments, as indicated at 820. In some embodiments, not illustrated, a transaction may be aborted if the storage nodes do not respond within a threshold period of time. If all responses are received, then a determination may be made as to whether the transaction was accepted, as indicated at 822. For example, if all storage nodes do not indicate that the individual requests to prepare the items for the transactions were accepted, then the transaction is to be aborted, as indicated by the negative exit from 822. As indicated at 824, in such a scenario, the transaction ledger may be updated to abort the transaction and a notification of the aborted transaction may be send to a client (or request routing node) and storage node(s) to remove the transaction, as indicated at 826, in some embodiments.

If the transaction is accepted, then as indicated at 828, the transaction ledger may be updated to indicate that the transaction is accepted, in some embodiments. As indicated at 830, requests to perform the item requests in the transaction, as indicated at 830, in some embodiments. As indicated at 832, a determination may be made as to whether completion acknowledgements have been received from each storage node. If not, then the requests to perform may be retried as indicated at 834. Once completions are received from each storage node, then as indicated at 836, the transaction ledger may be updated to identify the transaction as complete, in some embodiments. As indicated at 838, a notification may be sent that the transaction completed for a client, in some embodiments (e.g., to a client directly or request routing node).

Figure 9:
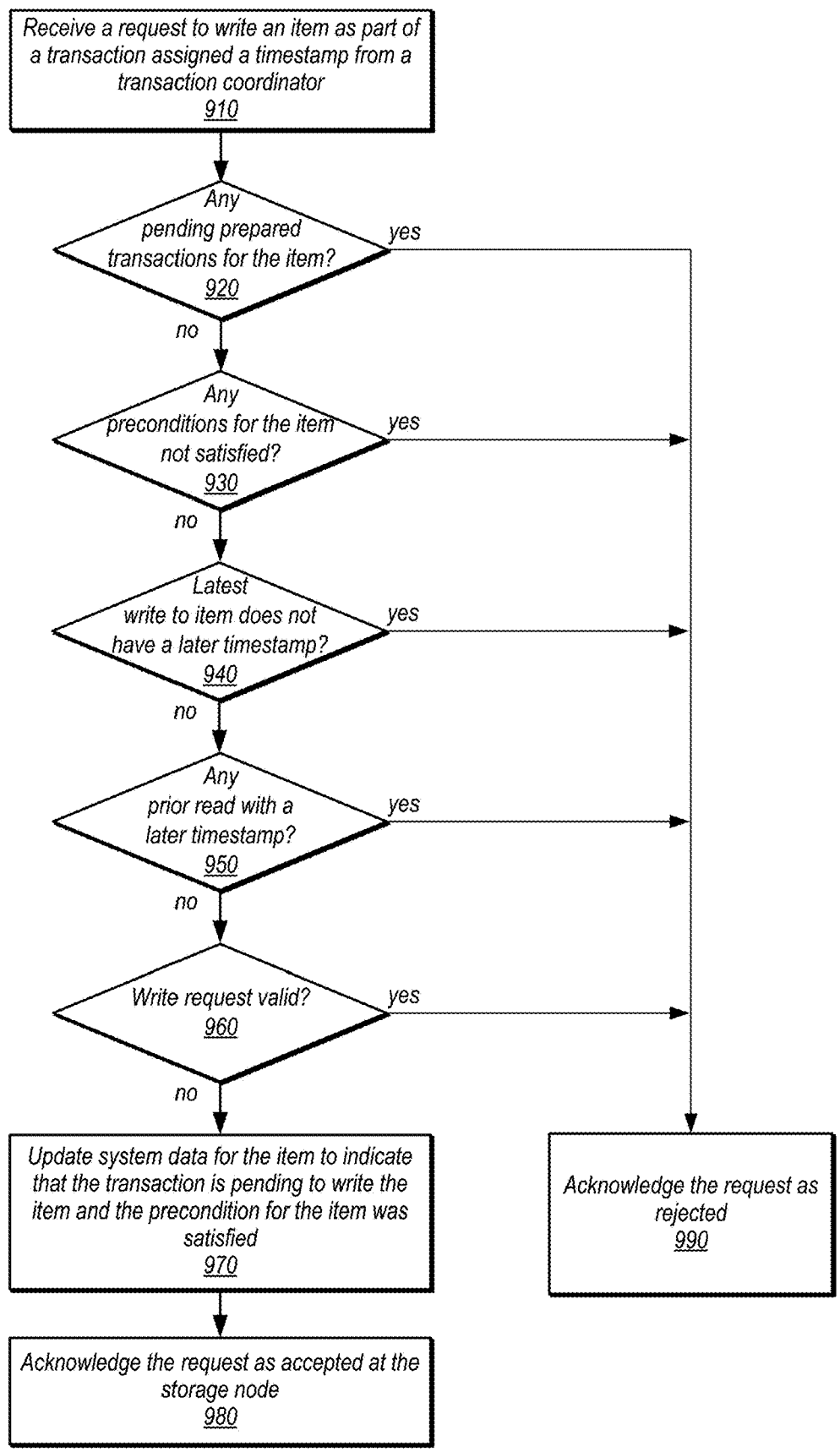
FIG. 9 is a high-level flowchart illustrating various methods and techniques to handle a request to write an item as part of a transaction, according to some embodiments.

As noted above, storage nodes may determine the ordering and/or performance of requests independently from other storage nodes (or a transaction coordinator node for non-transaction requests), in some embodiments. FIG. 9 is a high-level flowchart illustrating various methods and techniques to handle a request to write an item as part of a transaction, according to some embodiments. As indicated at 910, a request to write an item as part of a transaction is received that is assigned a timestamp from a transaction coordinator, in some embodiments. Various checks may be performed to determine whether the request can be acknowledged as accepted.

For example, as indicated at 920 the storage node checks that there are no pending, already prepared, transactions involving this item, in one embodiment. As indicated at 930, the storage checks that the preconditions (if existent) for the given item are met, in some embodiments. For example, if a precondition specifies a value for another attribute of another item in another table (e.g., value=="TRUE"), then the precondition may be satisfied. As indicated at 940, the storage node may check that the latest write performed on the item, either by a transaction or a singleton operation (e.g., a write, delete, update, add, etc.), did not have a later timestamp, thereby rendering the current transaction obsolete, in some embodiments. For example, a timestamp comparison may be made alone, but if a tied value is found (which would be impossible if the transactions were from the same transaction coordinator node), then the transaction coordinator identifier may be used as a tie-break value (e.g., the lesser of the transaction identifier values being the "winner").

As indicated at 950, the storage node may check that a prior read did not have a later timestamp than this proposed transaction, in some embodiments. By checking for this scenario, the storage node may prevent the transaction from performing a write that would have affect the result of that read, in some embodiments. As indicated at 960, the storage node may check to determine if the write request is valid. For example, by determining that writing the item would not raise any validation errors such as exceeding the maximum item size or adding a numerical value to a string attribute.

For a request that fails any one of the checks, the request may be acknowledged by the storage node as rejected, in some embodiments, as indicated at 990. For requests that satisfy the checks, system data may be updated, as indicated at 970 in order to allow for proper evaluation of future requests (e.g., transactions and other non-transaction requests). The system data for the item may be updated to indicate that the transaction is pending to write the item and the precondition for the item was satisfied, in some embodiments. As indicated at 980, the request may be acknowledged as accepted at the storage node, in some embodiments.

Application of the described checks can lead to various different acceptance/rejection scenarios. Consider the case of a new transaction (Tx2) whose prepare message arrives at a storage node after a previously completed transaction (Tx1) and writes at least one of the same items. If Tx2 was assigned an earlier timestamp than that of Tx1, then Tx2 may be rejected. In this scenario, executing Tx2 after Tx1 may leave the table in a state that is not consistent with the respective assigned timestamps. Thus, in some cases ordering of transactions different from their respective timestamps can occur if different transaction coordinator nodes assigned timestamps to Tx1 and Tx2, and these coordinators have clocks that are out-of-sync. However, in other scenarios where Tx2 has a later commit time, Tx2 will be accepted unless Tx2 has a precondition on the item that is not currently satisfied, as evaluated at 930.

Consider another example. Suppose that Tx2 arrives after Tx1 at a storage node, and Tx1 has been accepted but not completed. Transactions Tx1 and Tx2 are concurrent transactions that are attempting to write the same item, and thus are conflicting. But that does not mean that Tx2 is necessarily rejected. For example, if Tx2 was assigned an earlier timestamp than that of conflicting transaction Tx1, then Tx2 may likely be rejected. If Tx2 had been executed before Tx1 arrived, Tx2 would have left the table in a different state, and preconditions for Tx1 that were satisfied without Tx2 may have been violated with Tx2's prior execution. This could lead to Tx2 being rejected. However, it may be the case that Tx1 had no conditions on this item, in which case Tx2 can be accepted even though Tx1 has also been accepted. When accepting multiple concurrent transactions, the storage node may ensure that the concurrent transaction writes are performed in the correct order during a phase two protocol, similar to that discussed above with regard to FIG. 8, in some embodiments.

Another scenario may be where Tx2 has a commit time that is later than Tx1. In this case, Tx2 can also be accepted if it has no preconditions on this item. On the other hand, if Tx2 has a precondition, it is possible that the execution of Tx1 will affect whether this condition is met. While the storage node could delay making a decision about Tx2 until after Tx1 completes, in some embodiments, in other embodiments the storage node may reject Tx2.

In various embodiments, a storage node may always perform the writes of any transactions that it has accepted and that were committed. However, the storage node may not necessarily physically perform the writes in the order defined by their timestamps. The storage node can, for instance, ensure that the order in which transactions are executed leaves the tables in the equivalent state as if the transactions were executed serially. For example, suppose that two transactions Tx1 and Tx2 have both been accepted by some storage node, and that transaction Tx1 has a timestamp less than that of transaction Tx2. If the phase two for Tx1 is performed before phase two for Tx2, then the writes may be performed in the correct order as defined by the timestamps. However, if the storage node is asked to perform Tx2 while Tx1 is still in the accepted state, then Tx2 can be processed immediately as long as it is performing a request to add/put/insert the item or delete the item. Later, when the writes for Tx1 are requested, these operations can be ignored since they were made obsolete by Tx2's actions. On the other hand, if Tx2's write is a write/update/modify operation, then its outcome may be determined based on Tx1's write. In this case, the request to perform Tx2 may be rejected. The transaction coordinator node may wait a small amount of time to give Tx1 a chance to complete before retrying phase two for Tx2, in some embodiments.

Figure 10:
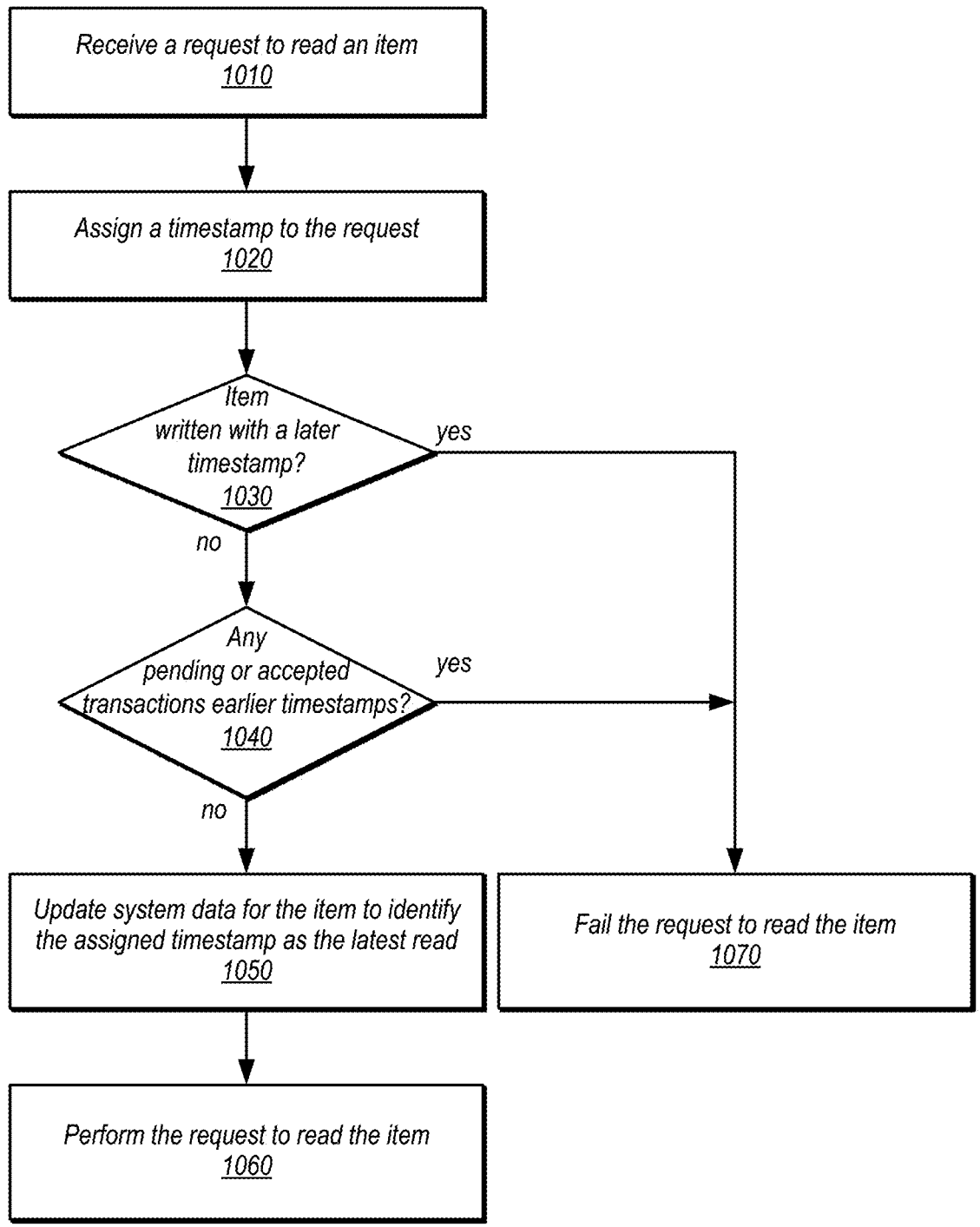
FIG. 10 is a high-level flowchart illustrating various methods and techniques to handle a request to read an item, according to some embodiments.

In some embodiments, read requests may not wait for in-progress transactions, even if they desire strong consistency. A consistency level specified for a read request that is "strongly consistent" may return the result of any previously completed transaction or non-transactional write, and may observe the result of a committed in-progress transaction, in some embodiments. A consistency level specified for a read request that is "eventually consistent" may be serviced by reading the current value of an item even if there are pending transactions. Since items may not be written until after a transaction has reached the commit decision, read requests can read the latest value that was written, in some embodiments. FIG. 10 is a high-level flowchart illustrating various methods and techniques to handle a request to read an item, according to some embodiments.

As indicated at 1010, a request to read an item may be received, in some embodiments. A timestamp may be assigned to the read request, in some embodiments, as indicated at 1020. For example, timestamps may be assigned that are later than any completed transactions and earlier than any accepted transactions, in some embodiments. In other embodiments, the timestamp may be based on the clock of the storage node.

As indicated at 1030, if the item was written with a later timestamp than the assigned timestamp (e.g., as described in the system data for the item), then the request to read the item may be failed, as indicated at 1070. In some embodiments, as indicated at 1040, if there any pending or accepted transactions with earlier timestamps than the assigned timestamp, then the request to read the item may be failed, as indicated at 1070.

For non-failed writes, system metadata for the item may be updated to identify the assigned timestamp as the latest read, as indicated at 1050, in some embodiments. As indicated at 1060, the request to read the item may then be performed, in some embodiments. Alternatively, if storage nodes maintained a multi-version store for items, reads with timestamps in the past could be serviced even if later writes have already been performed, in some embodiments. In some embodiments, queries, scans, or batch read requests may not be transactionally consistent.

In various embodiments, when storage nodes receive requests to insert/put an item, update/write an item, or delete an item outside of a transaction, these operations may be assigned timestamps by the storage node, which may assign a timestamp in a manner that avoids conflicts with in-process transactions whenever possible, in some embodiments. For example, consider a scenario in which a request to put an item is received after transaction Tx1 has completed its write to this item and after transaction Tx2 has been accepted. If the newly received request to put the item is unconditional, then it can be assigned a later time than Tx2 and performed immediately. If Tx2 has no precondition on the item, then the new put item request can be assigned a timestamp that is between Tx1 and Tx2 and be processed immediately. If Tx2 and the request to put the item are both conditional writes to the same item, then the request to put the item may be rejected since Tx2 has already been accepted, in some embodiments. When the item is written, the timestamp that was assigned to the request to put the item may be stored as a system attribute on the item, as noted above in FIG. 5B, in some embodiments.

Figure 11:
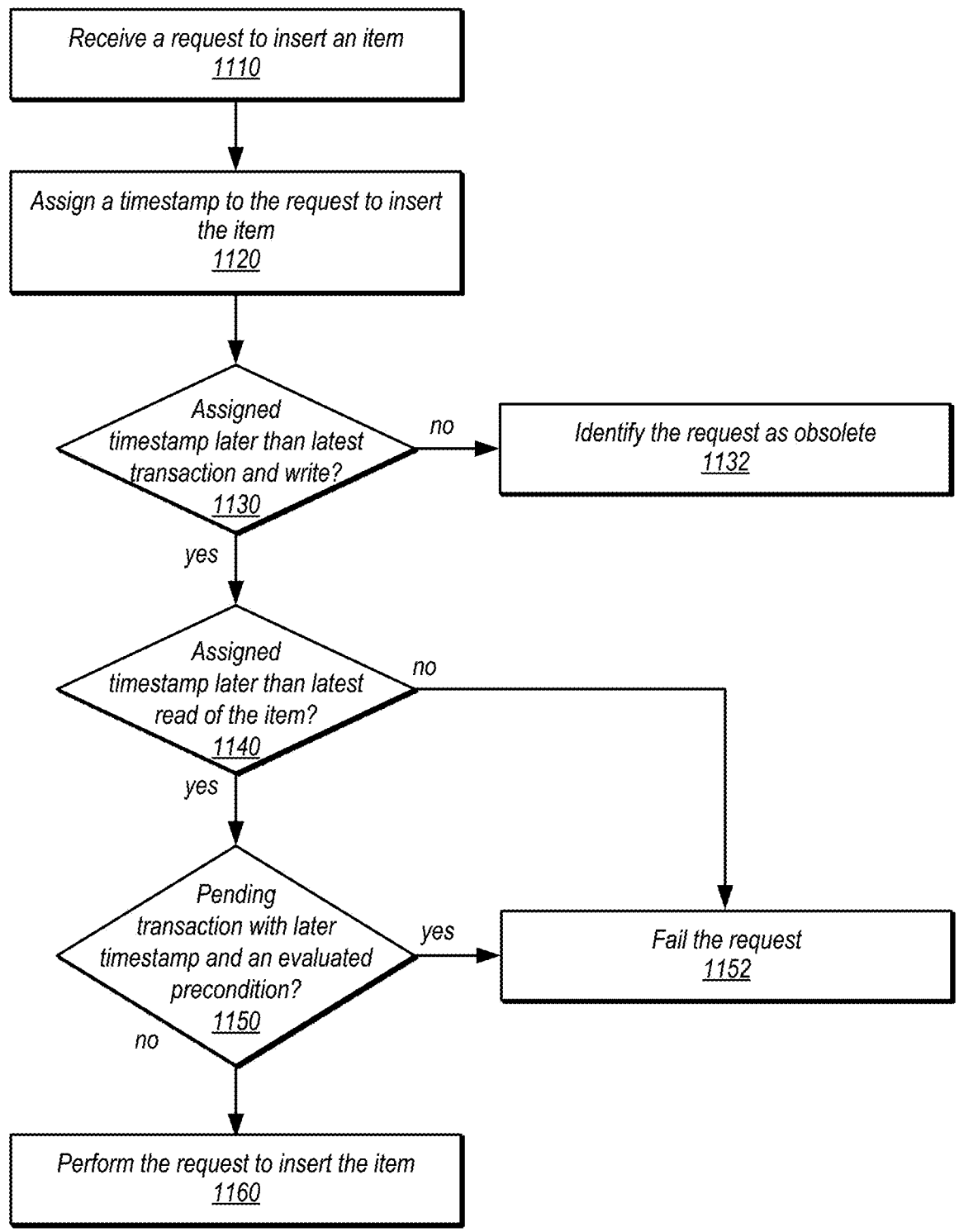
FIG. 11 is a high-level flowchart illustrating various methods and techniques to handle a request to insert an item, according to some embodiments.

FIG. 11 is a high-level flowchart illustrating various methods and techniques to handle a request to insert an item, according to some embodiments. As indicated at 1110, a request to insert or put an item may be received, in some embodiments. The request may be assigned a timestamp, as indicated at 1120, in some embodiments. As indicated at 1130, if the assigned timestamp is not later than the latest transaction and write to the item's respective timestamps, the request may be identified as obsolete, as indicated at 1132 in some embodiments.

As indicated at 1140, a determination may be made as to whether the assigned timestamp for the request is later than the latest read of the item, if not, then the request may be failed, as indicated at 1152, in some embodiments. As indicated at 1150, a determination may be made as to whether a transaction is pending with a later timestamp and an evaluated precondition. If so, then as indicated at 1152, the request may be failed. If not, then as indicated at 1160, the request to insert the item may be performed, in some embodiments.

Consider again the examples discussed above with regard to Tx1 and Tx2. Requests to update or write items may not be assigned a timestamp that is later than Tx2 without waiting for Tx2 to complete, in some embodiments. So a request to update or write an item may be rejected if Tx2 has a precondition that prevents the request from jumping ahead in the serialization order, in some embodiments. In various embodiments, requests to delete items may be handled in a similar manner, except that the item may not be deleted immediately. The timestamp system attribute may be retained for some period of time as a tombstone, in some embodiments.

Figure 12:
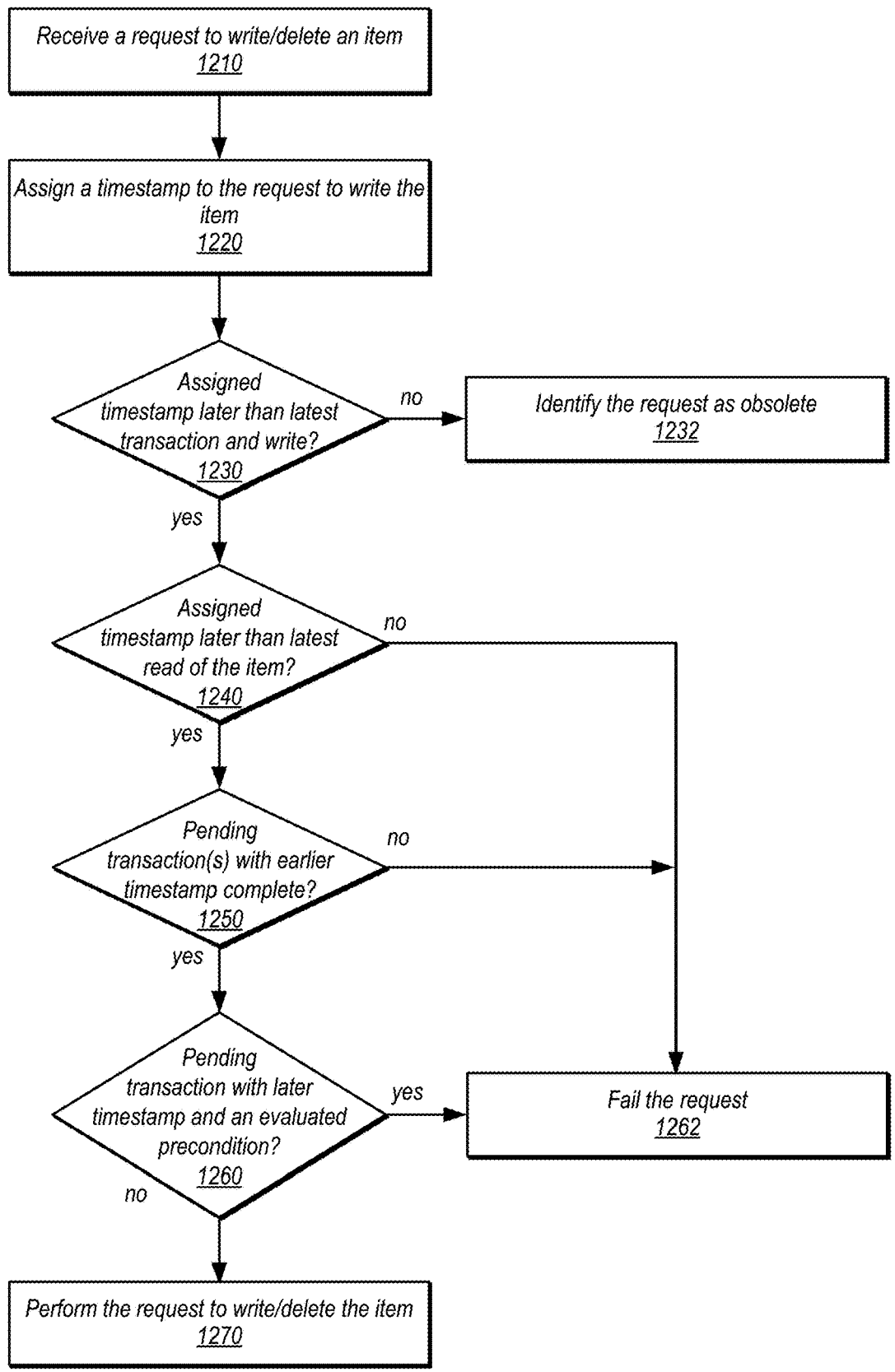
FIG. 12 is a high-level flowchart illustrating various methods and techniques to handle a request to write or delete an item, according to some embodiments.

FIG. 12 is a high-level flowchart illustrating various methods and techniques to handle a request to write or delete an item, according to some embodiments. As indicated at 1210, a request to write or delete an item may be received, in some embodiments. The request may be assigned a timestamp, as indicated at 1220, in some embodiments. As indicated at 1230, if the assigned timestamp is not later than the latest transaction and write to the item's respective timestamps, the request may be identified as obsolete, as indicated at 1232 in some embodiments.

As indicated at 1240, a determination may be made as to whether the assigned timestamp for the request is later than the latest read of the item, if not, then the request may be failed, as indicated at 1262, in some embodiments. As indicated at 1250, a determination may be made as to whether a transaction is pending with an earlier timestamp is complete. If so, then as indicated at 1262, the request may be failed. As indicated at 1260, a determination may be made as to whether a transaction is pending with a later timestamp and an evaluated precondition. If so, then as indicated at 1262, the request may be failed. If not, then as indicated at 1270, the request to write or delete the item may be performed, in some embodiments.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 13:
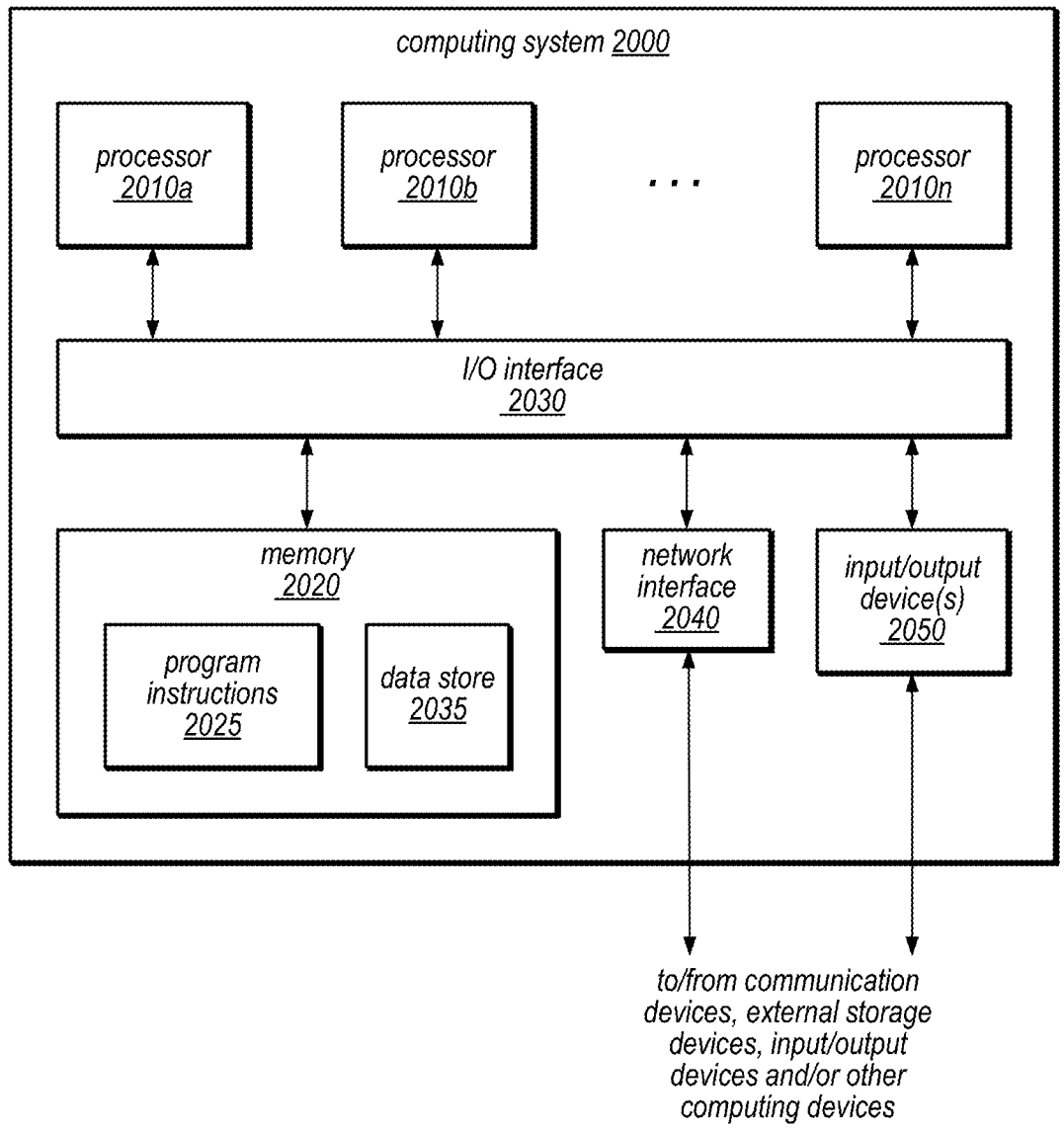
FIG. 13 is a block diagram illustrating an example computing system, according to some embodiments.

Embodiments to implement ordering transaction requests in a distributed database according to an independently assigned sequence as described herein may be executed on one or more computer systems, which may interact with various other devices. One such computer system is illustrated by FIG. 13. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 13, memory 2020 may include program instructions 2025, that implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive, by a transaction coordinator node, a request to perform a transaction at a distributed database;
assign, by the transaction coordinator node, a first sequence number to order performance of the transaction at a storage node of the distributed database;
receive, by the storage node, a non-transactional request to access the distributed database;
assign, by the storage node, a second sequence number by the storage node to order performance of the non-transactional request at the storage node; and
perform, by the storage node, the transaction request and the non-transactional request at the storage node according to an order determined based, at least in part, on the assigned sequence numbers.

2. The system of claim 1, wherein the program instructions cause the at least one processor to further perform the method to at least:
send, by the transaction coordinator node a request to the storage node to prepare the storage node to perform the transaction; and
after receipt of responses from the storage node and one or more other storage nodes that acknowledge acceptance of the transaction for performance, send, by the transaction coordinator a request to the storage node to perform the transaction, wherein the performance of the transaction request is performed after receipt of the request to perform the transaction.

3. The system of claim 2, wherein the program instructions cause the at least one processor to further perform the method to at least:
responsive to the receipt of the request to perform the transaction, store an entry for the transaction in a transaction ledger;
responsive to the receipt of the responses from the storage node and the one or more other storage nodes that acknowledge acceptance of the transaction for performance, update the entry for the transaction in the transaction ledger to indicate that the transaction is committed; and
responsive to receipt of completions of the transaction from the storage node and the one or more other storage nodes, update the entry for the transaction in the transaction ledger to indicate that the transaction is completed.

4. The system of claim 1, wherein the distributed database is a non-relational database service offered by a provider network, wherein the request to perform the transaction and the non-transactional request are received via a programmatic interface for the non-relational database service, and wherein the wherein the request to perform the transaction and the non-transactional request are routed to the transaction coordinator node and the storage node respectively by a request routing node implemented as part of the database service.

5. A method, comprising:
receiving a first request to access a distributed database that corresponds to a transaction coordinator node and is assigned a first sequence number by the transaction coordinator node to order performance of the first request at a storage node of the distributed database;
receiving a second request to access the distributed database that corresponds to the storage node and is assigned a second sequence number by the storage node to order performance of the second request at the storage node; and
performing the first request and the second request at the storage node according to an order determined based, at least in part, on the assigned sequence numbers.

6. The method of claim 5, further comprising:
sending, by the transaction coordinator node, a request to the storage node to prepare the storage node to perform the first request; and
after receiving responses from the storage node and one or more other storage nodes that acknowledge acceptance of the first request for performance, sending a request to the storage node to perform the first request, wherein the performance of the transaction request is performed after receipt of the request to perform the transaction.

7. The method of claim 6, further comprising:
responsive to receiving the request to perform the first request, storing an entry for the first request in a transaction ledger;
responsive to receiving the responses from the storage node and the one or more other storage nodes that acknowledge acceptance of the first request for performance, updating the entry for the first request in the transaction ledger to indicate that the first request is committed; and
responsive to receiving completions of the first request from the storage node and the one or more other storage nodes, updating the entry for the transaction in the transaction ledger to indicate that the first request is completed.

8. The method of claim 7, wherein the updating the entry for the first request in the transaction ledger to indicate that the first request is committed is performed by the transaction coordinator node, and wherein the updating the entry for the transaction in the transaction ledger to indicate that the first request is completed is performed by a second transaction coordinator node.

9. The method of claim 6, further comprising sending, by the transaction coordinator node, a second request to the storage node to prepare the storage node to perform the first request.

10. The method of claim 5, further comprising:
receiving a third request to access the distributed database that corresponds to a second transaction coordinator node and is assigned a third sequence number by the second transaction coordinator node to order performance of the third request at a storage node of the distributed database;
after receiving an indication that the third request is rejected by the storage node, sending, by the second transaction coordinator node, an indication that the third request is aborted to a client that submitted the third request.

11. The method of claim 10, further comprising sending, by the second transaction node to at least one other storage node that acknowledged the third request as accepted a notification that the third request is aborted.

12. The method of claim 5, wherein the second request is a request to read data, wherein the second request specifies a consistency level for the request to read data, and wherein the order is further determined based on the consistency level for the request to read data.

13. The method of claim 5, wherein the first sequence number is a first timestamp assigned according to a first clock for the transaction coordinator and wherein the second sequence number is a second timestamp assigned according to a second clock for the storage node.

14. A non-transitory, computer-readable storage medium, storing program instructions that when executed by one or more computing devices cause the one or more computing devices to implement:
receiving a first request to access a distributed database that corresponds to a transaction coordinator node;
assigning a first sequence number by the transaction coordinator node to order performance of the first request at a storage node of the distributed database;
receiving a second request to access the distributed database that corresponds to the storage node;
assigning a second sequence number by the storage node to order performance of the second request at the storage node; and
performing the first request and the second request at the storage node according to an order determined based, at least in part, on the assigned sequence numbers.

15. The non-transitory, computer-readable storage medium of claim 14, wherein the program instructions cause the one or more computing devices to further implement:
sending, by the transaction coordinator node a request to the storage node to prepare the storage node to perform the first request; and
after receiving responses from the storage node and one or more other storage nodes that acknowledge acceptance of the first request for performance, sending, by the transaction coordinator, a request to the storage node to perform the first request, wherein the performance of the transaction request is performed after receipt of the request to perform the transaction.

16. The non-transitory, computer-readable storage medium of claim 14, wherein the program instructions cause the one or more computing devices to further implement:
responsive to receiving the request to perform the first request, storing an entry for the first request in a transaction ledger;
responsive to receiving the responses from the storage node and the one or more other storage nodes that acknowledge acceptance of the first request for performance, updating the entry for the first request in the transaction ledger to indicate that the first request is committed; and
responsive to receiving completions of the first request from the storage node and the one or more other storage nodes, updating the entry for the transaction in the transaction ledger to indicate that the first request is completed.

17. The non-transitory, computer-readable storage medium of claim 14, wherein the program instructions cause the one or more computing devices to further implement:
- receiving a third request to access the distributed database that corresponds to a second transaction coordinator node and is assigned a third sequence number by the second transaction coordinator node to order performance of the third request at a storage node of the distributed database;
- after receiving an indication that the third request is rejected by the storage node, sending, by the second transaction coordinator node, an indication that the third request is aborted.

18. The non-transitory, computer-readable storage medium of claim 14, wherein the second sequence number assigned to the second request by the storage node is received from a request routing node that routed the second request to the storage node.

19. The non-transitory, computer-readable storage medium of claim 14, wherein the second request is a request to read data, wherein the second request specifies a consistency level for the request to read data, and wherein the order is further determined based on the consistency level for the request to read data.

20. The non-transitory, computer-readable storage medium of claim 14, wherein the distributed database is a database service offered by a provider network and wherein the request to perform the transaction and the non-transactional request are received via a programmatic interface for the non-relational database service.

* * * * *